(12) United States Patent
Hager (10) Patent No.: US 12,080,531 B2
(45) Date of Patent: Sep. 3, 2024

(54) FOURIER TRANSFORM QUADRUPOLE CALIBRATION METHOD

(71) Applicant: DH TECHNOLOGIES DEVELOPMENT PTE. LTD., Singapore (SG)

(72) Inventor: James Hager, Mississauga (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 161 days.

(21) Appl. No.: 17/756,928

(22) PCT Filed: Sep. 29, 2020

(86) PCT No.: PCT/IB2020/059071
§ 371 (c)(1),
(2) Date: Jun. 6, 2022

(87) PCT Pub. No.: WO2021/123937
PCT Pub. Date: Jun. 24, 2021

(65) Prior Publication Data
US 2023/0010966 A1    Jan. 12, 2023

Related U.S. Application Data

(60) Provisional application No. 62/949,342, filed on Dec. 17, 2019.

(51) Int. Cl.
*H01J 49/00* (2006.01)
*G06F 17/14* (2006.01)
*H01J 49/06* (2006.01)

(52) U.S. Cl.
CPC ........ *H01J 49/0009* (2013.01); *G06F 17/142* (2013.01); *H01J 49/063* (2013.01)

(58) Field of Classification Search
CPC ...... H01J 49/0009; H01J 49/063; H01J 49/38; H01J 49/4215; G06F 17/142
See application file for complete search history.

(56) References Cited

U.S. PATENT DOCUMENTS

| 6,452,168 B1* | 9/2002 | McLuckey | H01J 49/38 |
| | | | 250/282 |
| 2018/0114686 A1* | 4/2018 | Cooks | H01J 49/0031 |

FOREIGN PATENT DOCUMENTS

WO    2018142265 A1    8/2018

OTHER PUBLICATIONS

Hogan et al., "Performance simulation of a Quadrupole mass filter operating in the first and third stability zones," IEEE Transaction on Instrumentation and Measurement, vol. 57, No. 3 pp. 498-508. (Year: 2008).*

(Continued)

*Primary Examiner* — Kiho Kim
(74) *Attorney, Agent, or Firm* — Potomac Law Group, PLLC; Reza Mollaaghababa; Brian Hairston (57) ABSTRACT

In one aspect, a method of calibrating a Fourier Transform (FT) multipole mass spectrometer is disclosed, which comprises measuring a plurality of secular frequencies of a calibrant ion in a multipole FT mass analyzer for a plurality of RF voltages ($V_{RF}$) applied to at least one rod of the multipole mass analyzer, calculating Mathieu β and q parameters for each of 5 the measured secular frequencies, and determining RF voltage amplitude ($V_{RF}$) for each calculated q parameter. For each calculated q parameter, an offset RF voltage amplitude ($\Delta V_{RF}$) corresponding to a deviation of the applied $V_{RF}$ and the calculated $V_{RF}$ is determined so as to generate a $\Delta V_{RF}$ v.s. q calibration curve.

18 Claims, 10 Drawing Sheets

(56) References Cited

OTHER PUBLICATIONS

International Search Report and Written Opinion for PCT/IB2020/059071, mailed Jul. 12, 2020.
Marshall et al. "Fourier Transform Ion Cyclotron Resonance Mass Spectrometry: a Primer", Mass Spectrometry Reviews, John Wiley and Sons, New York, NY, US, vol. 17, No. 1, Jan. 1, 1998, pp. 1-35, XP002378524.

* cited by examiner

| Q3 Set mass (q=0.706) | Measured Secular (Hz) | q-Value based on measured secular frequency | Calculated q-value | Calculated Secular (Hz) | q-Value based on Measured Secular | V(RF) based on Measured Secular | Calculated V(RF) based on q=0.706 | delta V(RF) 59+ | delta V(RF) 266+ | delta V(RF) 609+ | delta V(RF) 829+ |
|---|---|---|---|---|---|---|---|---|---|---|---|
| 59+ | | | | | | | | | | | |
| 15 | 50849 | 0.128 | 0.179 | 71064.34 | 0.128 | 16.811 | 23.52 | -6.71 | | | |
| 20 | 78107 | 0.196 | 0.239 | 95039.23 | 0.196 | 25.709 | 31.36 | -5.65 | | | |
| 25 | 104268 | 0.260 | 0.299 | 120368.24 | 0.260 | 34.114 | 39.20 | -5.08 | | | |
| 35 | 157140 | 0.388 | 0.419 | 171755.31 | 0.388 | 50.519 | 54.88 | -4.36 | | | |
| 45 | 212460 | 0.508 | 0.538 | 227240.92 | 0.508 | 66.529 | 70.56 | -4.03 | | | |
| 50 | 242108 | 0.568 | 0.598 | 257374.25 | 0.568 | 74.492 | 78.40 | -3.91 | | | |
| 55 | 273635 | 0.629 | 0.658 | 289905.67 | 0.629 | 82.404 | 86.24 | -3.83 | | | |
| 60 | 305107 | 0.689 | 0.718 | 325828.82 | 0.689 | 90.326 | 94.08 | -3.75 | | | |
| 65 | 340358 | 0.750 | 0.778 | 367106.33 | 0.750 | 98.247 | 101.92 | -3.67 | | | |
| 70 | 393093 | 0.810 | 0.838 | 418795.56 | 0.810 | 106.152 | 109.76 | -3.63 | | | |
| 75 | 457480 | 0.871 | 0.897 | 504791.80 | 0.871 | 114.120 | 117.60 | -3.48 | | | |
| 266+ | | | | | | | | | | | |
| 20 | 10088 | 0.026 | 0.053 | 20962.44 | 0.026 | 15.063 | 31.36 | | -16.28 | | |
| 30 | 24751 | 0.063 | 0.080 | 31495.41 | 0.063 | 36.984 | 47.04 | | -10.06 | | |
| 40 | 36614 | 0.093 | 0.106 | 42034.68 | 0.093 | 54.660 | 62.72 | | -8.06 | | |
| 50 | 47806 | 0.121 | 0.133 | 52209.32 | 0.121 | 71.283 | 78.40 | | -7.11 | | |

FIG. 5

| | | | | | | | |
|---|---|---|---|---|---|---|---|
| 60 | 59086 | 0.149 | 0.153 | 63228.71 | 0.149 | 87,970 | 94.08 | -5.11 |
| 70 | 66835 | 0.176 | 0.186 | 73302.59 | 0.176 | 103.881 | 109.76 | -5.88 |
| 80 | 80946 | 0.203 | 0.212 | 84641.17 | 0.203 | 120.053 | 125.44 | -5.38 |
| 90 | 91980 | 0.230 | 0.239 | 95455.22 | 0.230 | 136.105 | 141.12 | -5.01 |
| 100 | 102337 | 0.257 | 0.265 | 106336.19 | 0.257 | 151.893 | 156.80 | -4.90 |
| 120 | 125182 | 0.311 | 0.318 | 128468.94 | 0.311 | 163.536 | 188.16 | -4.62 |
| 130 | 136462 | 0.337 | 0.345 | 139708.39 | 0.337 | 199.326 | 203.84 | -4.51 |
| 150 | 156303 | 0.391 | 0.398 | 162622.73 | 0.391 | 230.966 | 235.19 | -4.23 |
| 170 | 183321 | 0.445 | 0.451 | 185277.98 | 0.445 | 262.705 | 266.55 | -3.85 |
| 180 | 195097 | 0.471 | 0.478 | 198427.76 | 0.471 | 277.966 | 282.23 | -4.27 |
| 200 | 220124 | 0.524 | 0.531 | 223525.00 | 0.524 | 309.429 | 313.59 | -4.16 |
| 220 | 246060 | 0.577 | 0.584 | 249935.92 | 0.577 | 341.044 | 344.95 | -3.91 |
| 230 | 260189 | 0.604 | 0.610 | 263755.62 | 0.604 | 356.635 | 360.63 | -4.00 |
| 240 | 274425 | 0.630 | 0.637 | 278071.13 | 0.630 | 372.374 | 376.31 | -3.94 |
| 250 | 289151 | 0.657 | 0.664 | 292367.28 | 0.657 | 388.007 | 391.99 | -3.95 |
| 260 | 304582 | 0.683 | 0.690 | 308552.53 | 0.683 | 403.748 | 407.67 | -3.92 |
| 270 | 320539 | 0.710 | 0.717 | 324489.58 | 0.710 | 419.300 | 423.35 | -4.05 |
| 280 | 338087 | 0.737 | 0.743 | 342412.76 | 0.737 | 435.238 | 439.00 | -3.79 |
| 290 | 355272 | 0.763 | 0.770 | 361169.07 | 0.763 | 450.742 | 454.71 | -3.97 |
| 300 | 376377 | 0.790 | 0.796 | 381627.49 | 0.790 | 466.514 | 470.39 | -3.88 |
| 310 | 398400 | 0.816 | 0.823 | 404308.54 | 0.816 | 462.072 | 466.07 | -3.99 |

FIG. 5 Continued

| | | | | | | | | |
|---|---|---|---|---|---|---|---|---|
| 320 | 423945 | 0.843 | 0.849 | 461100.73 | 0.843 | 497.803 | 501.75 | | |
| 330 | 455469 | 0.869 | 0.876 | 484765.51 | 0.869 | 513.636 | 517.43 | -3.95 | |
| 340 | 500750 | 0.896 | 0.902 | 519375.82 | 0.896 | 529.214 | 533.11 | -3.79 | |
| 150 | 67493 | 0.170 | 0.174 | 69078.22 | 0.170 | 229.860 | 235.19 | -3.89 | -5.33 |
| 250 | 115045 | 0.286 | 0.290 | 116411.87 | 0.286 | 387.543 | 391.99 | | -4.45 |
| 350 | 164588 | 0.403 | 0.406 | 165889.72 | 0.403 | 544.750 | 548.79 | | -4.04 |
| 450 | 217656 | 0.519 | 0.521 | 218966.39 | 0.519 | 701.794 | 705.58 | | -3.79 |
| 550 | 276755 | 0.635 | 0.637 | 278045.50 | 0.635 | 858.804 | 862.38 | | -3.58 |
| 600→ | 308309 | 0.692 | 0.695 | 311680.98 | 0.692 | 936.778 | 940.78 | | -4.00 |
| 650 | 347421 | 0.750 | 0.753 | 349322.55 | 0.750 | 1015.481 | 1019.16 | | -3.70 |
| 700 | 391612 | 0.808 | 0.811 | 394096.49 | 0.808 | 1093.670 | 1097.57 | | -3.91 |
| 750 | 451227 | 0.866 | 0.869 | 454947.63 | 0.866 | 1172.155 | 1175.97 | | -3.82 |
| 725 | 418328 | 0.837 | 0.840 | 421289.99 | 0.837 | 1152.813 | 1156.77 | | -3.96 |
| 770 | 487773 | 0.889 | 0.892 | 492786.06 | 0.889 | 1203.548 | 1207.33 | | -3.78 |
| 820→ | | | | | | | | | |
| 50 | 13746 | 0.035 | 0.043 | 16318.05 | 0.035 | 64.088 | 78.40 | | -14.31 |
| 100 | 31866 | 0.081 | 0.085 | 33671.97 | 0.081 | 146.416 | 156.80 | | -8.38 |
| 150 | 49190 | 0.124 | 0.128 | 50596.32 | 0.124 | 228.700 | 235.19 | | -6.49 |
| 200 | 66475 | 0.167 | 0.170 | 67535.20 | 0.167 | 306.269 | 313.59 | | -5.30 |
| 250 | 83609 | 0.210 | 0.213 | 84623.03 | 0.210 | 386.499 | 391.99 | | -5.49 |

FIG. 5 Continued

| 350 | 110609 | 0.295 | 0.298 | 118831.19 | 0.295 | 543.417 | 548.79 | | | -5.37 |
|---|---|---|---|---|---|---|---|---|---|---|
| 450 | 154393 | 0.381 | 0.383 | 156037.32 | 0.381 | 701.165 | 706.58 | | | -4.40 |
| 550 | 192317 | 0.466 | 0.468 | 193391.10 | 0.466 | 858.107 | 862.38 | | | -4.27 |
| 650 | 228322 | 0.551 | 0.553 | 234488.37 | 0.551 | 1014.880 | 1019.19 | | | -4.30 |
| 750 | 277578 | 0.636 | 0.638 | 270810.61 | 0.636 | 1171.900 | 1175.97 | | | -4.07 |
| 800 | 304694 | 0.679 | 0.681 | 303074.17 | 0.679 | 1250.029 | 1264.37 | | | -4.34 |
| 900 | 356851 | 0.764 | 0.766 | 358457.22 | 0.764 | 1407.406 | 1411.17 | | | -3.76 |
| 1000 | 430654 | 0.849 | 0.851 | 423083.51 | 0.849 | 1563.821 | 1587.96 | | | -4.14 |
| 1050 | 490828 | 0.891 | 0.894 | 495362.80 | 0.891 | 1642.043 | 1646.36 | | | -4.32 |
| 1100 | 511103 | 0.900 | 0.902 | 518811.70 | 0.900 | 1657.711 | 1662.04 | | | -4.33 |

FOURIER TRANSFORM QUADRUPOLE CALIBRATION METHOD

RELATED APPLICATION

This application claims priority to U.S. provisional application No. 62/949,342 filed on Dec. 17, 2019, entitled "Fourier Transform Quadrupole Calibration Method," which is incorporated herein by reference in its entirety.

BACKGROUND

The present teachings generally relate to methods and systems for performing mass spectrometry, and more particularly to methods and systems for calibrating a Fourier Transform (FT) mass spectrometer.

Mass spectroscopy (MS) is an analytical technique for determining the elemental composition of test substances with both quantitative and qualitative applications. For example, MS can be used to identify unknown compounds, to determine the isotopic composition of elements in a molecule, and to determine the structure of a particular compound by observing its fragmentation, as well as to quantify the amount of a particular compound in the sample.

A variety of mass analyzers are known. Some such mass analyzers employ a plurality of rods arranged in a multipole arrangement, e.g., a quadrupole arrangement. The application of radiofrequency (RF) voltages to the rods can provide an electromagnetic field for radial confinement of ions as they pass through the mass analyzer. There is a difficulty in calibrating any RF voltage-based mass spectrometer where the measured quantity in the secular frequency of ions within the mass spectrometer (i.e., the characteristic oscillation frequency of an ion in the RF field). Conventional calibration methods based on secular frequency of ions within a quadrupole field are known, but they are typically complicated. For example, a calibration method for a secular frequency scanning ion trap is known, but it is difficult to implement and depends on knowing mass-dependent delays for ion ejection from the ion trap. The inherent difficulty in such calibration methods arises from non-linear relationship between the measured ion secular frequency and m/z ratios of the ions.

Accordingly, there is a need for improved calibration methods and systems for calibrating a Fourier Transform (FT) mass spectrometer.

SUMMARY

In one aspect, a method of calibrating a Fourier Transform (FT) multipole mass spectrometer is disclosed, which comprises measuring a plurality of secular frequencies of a calibrant ion in a multipole FT mass analyzer for a plurality of RF voltages ($V_{RF}$) applied to at least one rod of the multipole mass analyzer, calculating Mathieu β and q parameters for each of the measured secular frequencies, and determining RF voltage amplitude ($V_{RF}$) for each calculated q parameter. For each calculated q parameter, an offset RF voltage amplitude ($\Delta_{RF}$) corresponding to a deviation of the applied $V_{RF}$ and the calculated $V_{RF}$ is determined so as to generate a $\Delta V_{RF}$ v.s. q calibration curve.

In some embodiments, the secular frequency of the calibrant ion can be determined by introducing the calibrant ion into the FT mass analyzer and applying a pulsed excitation voltage to at least one rod of the multipole mass analyzer so as to excite the calibrant ion at a secular frequency thereof.

In some embodiment, the pulsed excitation voltage can be in the form of a dipolar excitation.

The calibration curve can then be employed to obtain accurate values of the q parameter for an analyte under study. For example, in some embodiments, a secular frequency of an analyte under study is measured, and the measured secular frequency is employed to calculate Mathieu β and q parameters for that analyte. The above calibration curve can then be employed to adjust the calculated q parameter and the adjusted q parameter can be used to calculate an m/z ratio of the analyte.

In some embodiments, a resolving DC voltage can be applied to at least one rod of the multipole mass analyzer. In such embodiments, in addition to Mathieu β parameter, Mathieu a parameter can also be calculated based on the measured resolving DC voltage. The q parameter associated with the analyte under study can then be determined based on the calculated Mathieu β and a parameters.

In some embodiments, the RF voltage(s) applied to the one or more rods of the FT mass analyzer can be in a range of about 50 volts to about 5000 volts (peak-to-peak). Further, in some such embodiments, the RF voltages can have a frequency in a range of about 0.5 MHz to about 3 MHz.

In some embodiments, the resolving DC voltage applied to at least one rod of the multipole FT mass analyzer can be, for example, in a range of about 5 to about 250 volts.

In a related aspect, a mass spectrometer is disclosed, which comprises a Fourier Transform (FT) mass analyzer having a plurality of rods arranged in a multipole configuration and having an input port for receiving a plurality of ions and an output port through which the ions exit the mass analyzer. The mass spectrometer can further include a system for measuring a plurality of secular frequencies of a calibrant ion introduced into the multipole mass analyzer for a plurality of RF voltages ($V_{RF}$) applied to at least one rod of said FT mass analyzer. An analysis module of the mass spectrometer can receive the measured secular frequencies and perform the following operations so as to generate a calibration curve: calculating Mathieu β and q parameters for each of said measured secular frequencies, determining RF voltage amplitude ($V_{RF}$) for each calculated q parameter, and for each calculated q parameter, determining an offset RF voltage amplitude ($\Delta_{RF}$) corresponding to a deviation of said applied $V_{RF}$ and said calculated $V_{RF}$ to generate a $\Delta V_{RF}$ v.s. q calibration curve.

The analysis module can further receive the amplitude of a resolving DC voltage applied to at least one of the rods of the FT mass analyzer, calculate Mathieu a parameter, and employ both the Mathieu β and a parameters for calculating the q parameter.

Further understanding of various aspects of the present teachings can be obtained with reference to the following detailed description in conjunction with the associated drawings, which are described briefly below.

DETAILED DESCRIPTION

The present teachings are generally related to methods and systems for calibrating a Fourier transform (FT) mass analyzer. Such methods and systems rely on measuring secular frequencies of a calibrant ion for a plurality of RF voltages applied to the rod(s) of the mass analyzer to generate a calibration curve. As discussed in more detail below, the measured secular frequencies are employed to calculate Mathieu $\beta$ and q parameters (as well as Mathieu a parameter when a DC resolving voltage is applied). For each value of q, an offset RF voltage amplitude corresponding to a deviation of the applied RF voltage and the calculated RF voltage can be determined to generate a calibration curve.

Figure 1:
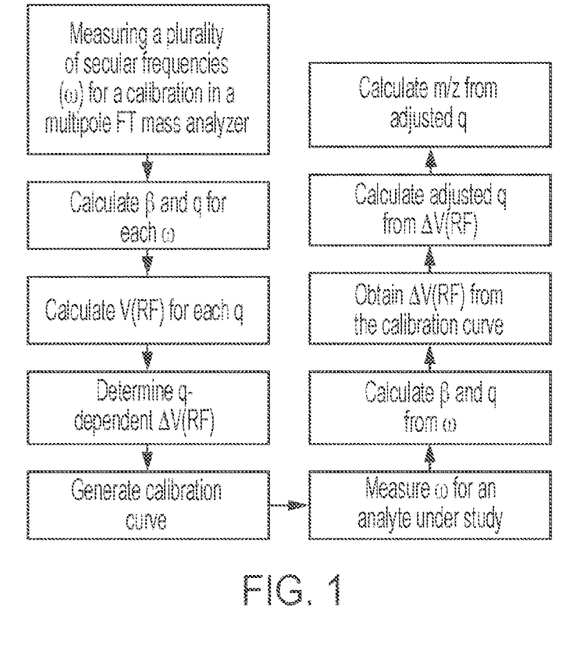
FIG. 1 is a flow chart depicting various steps in a method according to an embodiment for calibrating an FT mass analyzer.

More specifically, with reference to the flow chart of FIG. 1, in one embodiment of a method for calibrating a Fourier Transform (FT) multipole mass spectrometer according to the present teachings, a plurality of secular frequencies of a calibrant ion introduced into the FT mass analyzer is measured for a plurality of RF voltages ($V_{RF}$) applied to at least one rod of the multipole mass analyzer.

The secular frequencies of an ion within a mass analyzer comprising a plurality of rods arranged in a quadrupole configuration to which an RF voltage at a frequency $\Omega$ is applied can be obtained via the following relation:

$$\omega_n = (2n + \beta)\frac{\Omega}{2} \qquad \text{Eq. (1)}$$

where, n can be 0, ±1, ±2, ±3, . . . . For example, for n=0, the fundamental secular frequency $\omega_0$ is given by the following relation:

$$\omega_0 = \beta\frac{\Omega}{2} \qquad \text{Eq. (2)}$$

The Mathieu $\beta$ parameter is a continuing fractional expression of the a- and q-parameters. The exact value of $\beta$ is a continuing fraction expression in terms of the a- and q-Mathieu parameters. This continuing fraction expression can be found in the reference J. Mass Spectrom. Vol 32, 351-369 (1997), which is herein incorporated by reference in its entirety, and is provided below:

$$\beta^2 = a + \cfrac{q^2}{(\beta+2)^2 - a - \cfrac{q^2}{(\beta+4)^2 - a - \cfrac{q^2}{(\beta+6)^2 - a - \ldots}}} + \qquad \text{Eq. (3)}$$

$$\cfrac{q^2}{(\beta-2)^2 - a - \cfrac{q^2}{(\beta-4)^2 - a - \cfrac{q^2}{(\beta-6)^2 - a - \ldots}}}$$

The a- and q-parameters are then given by the following relations:

$$a = \pm \frac{8zU}{mr_0^2\Omega^2} \qquad \text{Eq. (4)}$$

$$q = \pm \frac{4zV}{mr_0^2\Omega^2} \qquad \text{Eq. (5)}$$

With continued reference to the flow chart of FIG. 1, following the measurement of the secular frequencies, Matheiu $\beta$ and q parameters can be calculated for each measured secular frequency corresponding to one of the applied $V_{RF}$ voltages. In some embodiments in which a DC resolving voltage is also applied to at least one rod of the FT mass analyzer, the Mathieu a parameter can also be determined for each measured secular frequency.

For each q (as well as a parameter when a DC resolving voltage is applied), the applied RF voltage ($V_{RF}$) is calculated. Subsequently, q-dependent $\Delta V_{RF}$, i.e., the difference between the applied and calculated $V_{RF}$, is calculated and is used to generate a calibration curve. As discussed in more detail below, the calibration curve can be employed to obtain accurate m/z ratios of one or more analytes under study.

More specifically, with continued reference to the flow chart of FIG. 1, an analyte under study can be introduced into the FT mass analyzer and its secular frequency for a given applied RF voltage ($V_{RF}$) can be measured. The measured secular frequency can then be employed to calculate Matheiu $\beta$ and q parameters for that analyte. In some embodiments in which a resolving DC voltage is also applied to the FT mass analyzer, Matheiu a parameter can also be determined.

The calibration curve can then be employed to look up $\Delta V_{RF}$ associated with the calculated q parameter. The $\Delta V_{RF}$ can then be employed to adjust the calculated q parameter in order to obtain a more accurate value of that parameter. In other words, the q parameter is calculated based on a $V_{RF}$ that takes into account $\Delta V_{RF}$ obtained from the calibration curve. The adjusted value of the q parameter can then be employed to determine the m/z ratio of the analyte (or its fragments) under study.

Figure 2A:
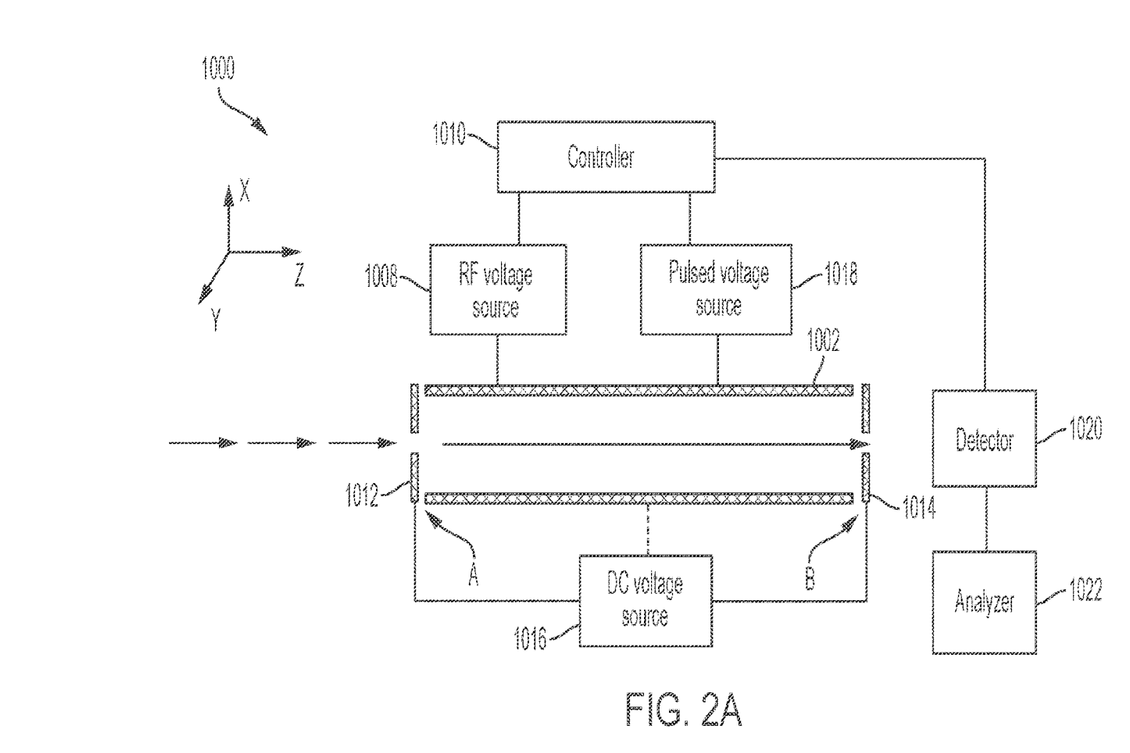
FIG. 2A is an FT mass analyzer in which a calibration system according to an embodiment of the present teachings is incorporated, FIG. 2B schematically depicts the quadrupole rods of the FT mass analyzer illustrated in FIG. 2A.
Figure 2B:
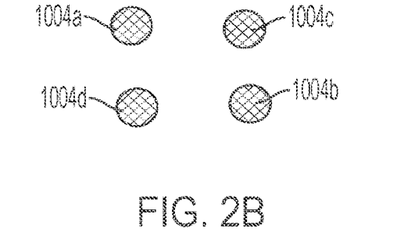

FIGS. 2A and 2B schematically depict a FT mass analyzer 1000 that incorporates a system for implementing a calibration method according to the present teachings. The FT mass analyzer 1000 includes a quadrupole rod set 1002 that extends from an input end (A) configured for receiving ions to an output end (B) through which ions can exit the quadrupole rod set.

In this embodiment, the quadrupole rod set includes four rods 1004a, 1004b, 1004c, and 1004d (herein collectively referred to as quadrupole rods 1004), which are arranged relative to one another to provide a passageway therebetween through which ions received by the quadrupole rod set can propagate from the input end (A) to the output end (B). In this embodiment, the quadrupole rods 1004 have a circular cross-section while in other embodiments they can have a different cross-sectional shape, such as hyperbolic.

The mass analyzer 1000 can receive ions, e.g., a continuous stream of ions, generated by an ion source (not shown in this figure). A variety of different types of ion sources can be employed. Some suitable examples include, without limitation, an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others.

The application of radiofrequency (RF) voltages to the quadrupole rods 1004 can provide a quadrupolar field for radial confinement of the ions as they pass through the quadrupole. The RF voltages can be applied to the rods with or without a selectable amount of a resolving DC voltage applied concurrently to one or more of the quadrupole rods.

In some embodiments, the RF voltages applied to the quadrupole rods 1004 can have a frequency in a range of about 0.8 MHz to about 3 MHz and an amplitude in a range of about 100 volts to about 1500 volts, though other frequencies and amplitudes can also be employed. In this embodiment, an RF voltage source 1008 operating under the control of a controller 1010 provides the required RF voltages to the quadrupole rods 1004.

In some embodiments, the pressure within the quadrupole rod set can be maintained in a range of about $1 \times 10^{-6}$ torr to about $1.5 \times 10^{-3}$ torr, e.g., in a range of about $8 \times 10^{-6}$ torr to about $5 \times 10^{-4}$ torr.

The application of the RF voltage(s) can result in the generation of a quadrupolar field within the quadrupole characterized by fringing fields in the vicinity of the input (entrance) and the exit ends of the quadrupole rod set. As discussed in more detail below such fringing fields can couple the radial and axial motions of the ions. By way of example, the diminution of the quadrupole potential in the regions in the proximity of the output end (B) of the quadrupole rod set can result in the generation of fringing fields, which can exhibit a component along the longitudinal direction of the quadrupole (along the z-direction). In some embodiments, the amplitude of this electric field can increase as a function of increasing radial distance from the center of the quadrupole rod set.

As discussed in more detail below, such a fringing field allows converting radial oscillations of ions excited via application of a voltage pulse to one or more of the quadrupole rods (and/or one or more auxiliary electrodes) to axial oscillations, where the axially oscillating ions are detected by a detector.

With continued reference to FIGS. 2A and 2B, in this embodiment, the mass analyzer 1000 further includes an input lens 1012 disposed in proximity of the input end of the quadrupole rod set and an output lens 1014 disposed in proximity of the output end of the quadrupole rod set. A DC voltage source 1016, operating under the control of the controller 1010, can apply two DC voltages, e.g., in range of about 1 to 50 V attractive relative to the DC offset of the quadrupole, to the input lens 1012 and the output lens 1014. In some embodiments, the DC voltage applied to the input lens 1012 causes the generation of an electric field that facilitates the entry of the ions into the mass analyzer. Further, the application of a DC voltage to the output lens 1014 can facilitate the exit of the ions from the quadrupole rod set.

The lenses 1012 and 1014 can be implemented in a variety of different ways. For example, in some embodiments, the lenses 1012 and 1014 can be in the form of a plate having an opening through which the ions pass. In other embodiments, at least one (or both) of the lenses 1012 and 1014 can be implemented as a mesh. There can also be RF-only Brubaker lenses at the entrance and exit ends of the quadrupole.

In some embodiments, the DC voltage source can apply a resolving DC voltage to one or more of the quadrupole rods so as to select ions within a desired m/z window. In some embodiments, such a resolving DC voltage can be in a range of about 10 to about 150 V.

With continued reference to FIGS. 2A and 2B, the FT mass analyzer 1000 further includes a pulsed voltage source 1018 for applying a pulsed voltage to at least one of the quadrupole rods 1004. In this embodiment, the pulsed voltage source 1018 applies a dipolar pulsed voltage to the rods 1004a and 1004b, though in other embodiments, the dipolar pulsed voltage can be applied to the rods 1004c and 1004d.

In some embodiments, the amplitude of the applied pulsed voltage can be, for example, in a range of about 10 volts to about 40 volts, or in a range of about 20 volts to about 30 volts, though other amplitudes can also be used. Further, the duration of the pulsed voltage (pulse width) can be, for example, in a range of about 10 nanoseconds (ns) to about 1 millisecond, e.g., in a range of about 1 microsecond to about 100 microseconds, or in a range of about 5 microseconds to about 50 microseconds, or in a range of about 10 microseconds to about 40 microseconds, though other pulse durations can also be used. In general, a variety of pulse amplitudes and durations can be employed. In many embodiments, the longer is the pulse width, the smaller is the pulse amplitude. Ions passing through the quadrupole are normally exposed to only a single excitation pulse. Once the "slug" of excited ions passes through the quadrupole, an additional excitation pulse is triggered. This normally occurs every 1 to 2 ms, so that about 500 to 1000 data acquisition periods are collected each second.

Without being limited to any particular theory, the application of the voltage pulse, e.g., across two diagonally opposed quadrupole rods, generates a transient electric field within the quadrupole. The exposure of the ions within the quadrupole to this transient electric field can radially excite at least some of those ions at their secular frequencies. Such excitation can encompass ions having different mass-to-charge (m/z) ratios. In other words, the use of an excitation voltage pulse having a short temporal duration can provide a broadband radial excitation of the ions within the quadrupole.

As the radially excited ions reach the end portion of the quadrupole rod set in the vicinity of the output end (B), they will interact with the exit fringing fields. Again, without being limited to any particular theory, such an interaction can convert the radial oscillations of at least a portion of the excited ions into axial oscillations.

The axially oscillating ions leave the quadrupole rod set and the exit lens 1014 to reach a detector 1020, which operates under the control of the controller 1010. The detector 1020 generates a time-varying ion signal in response to the detection of the axially oscillating ions. A variety of detectors can be employed. Some examples of suitable detectors include, without limitation, are Photonis Channeltron Model 4822C and ETP electron multiplier Model AF610.

An analyzer 1022 (herein also referred to as an analysis module) in communication with the detector 1020 can receive the detected time-varying signal and operate on that signal to generate a mass spectrum associated with the detected ions.

In the calibration mode, a calibrant ion can be introduced into the FT mass analyzer and be radially excited via the application of a voltage pulse so as to generate a time-varying signal when detected by the downstream detector 1020. The analyzer 1022 can receive the time-varying signal from the detector 1020 and can obtain a Fourier transform of the detected time-varying signal. The analyzer can operate on the frequency domain signal to obtain the secular frequency of the calibrant ion in the following manner. In particular, the analyzer can compute the Mathieu a- and q-parameters associated with the calibrant ion in the following way:

$$a_x = -a_y = \frac{8zU}{\Omega^2 r_0^2 m} \quad \text{Eq. (6)}$$

$$q_x = -q_y = \frac{4zV}{\Omega^2 r_0^2 m} \quad \text{Eq. (7)}$$

where z is the charge on the ion, U is the DC voltage on the rods, V is the RF voltage amplitude, Ω is the angular frequency of the RF, and $r_0$ is the characteristic dimension of the quadrupole. The radial coordinate r is given by $$r^2 = x^2 + y^2 \quad \text{Eq. (8)}$$

In addition, when q<~0.4 the parameter β is given by the $$\beta^2 = a + \frac{q^2}{2} \quad \text{Eq. (9)}$$

and the fundamental secular frequency is given by $$\omega = \frac{\beta \Omega}{2} \quad \text{Eq. (10)}$$

The above process can be repeated for a plurality of applied RF voltages ($V_{RF}$) to obtain a plurality of secular frequencies each of which is associated with one of the applied RF voltages. The secular frequencies can then be employed in a manner discussed above to generate a q-dependent $\Delta V_{RF}$ calibration curve. The calibration curve can be stored in the analyzer to be used for adjusting the value of q obtained for an analyte under study, thus resulting in more accurate determination of an m/z ratio of the analyte.

In use, an analyte (or fragments thereof) can be introduced in the FT mass analyzer, e.g., from an upstream collision cell or an ion guide. The analyte can be radially excited via application of a pulsed DC voltage to at least one rod of the FT mass analyzer. As discussed above, the radial oscillations of the analyte can be converted into axial oscillations via the fringing fields at the distal end of the FT mass analyzer as the analyte ion (or its fragments) exit the FT mass analyzer. These oscillations can be detected by the downstream detector 1020, which generates a time-varying detection signal.

The analyzer 1022 can receive this time-varying detection signal and determine the Mathieu q parameter associated with that analyte ion. If a DC resolving voltage is also applied to FT mass analyzer, the Mathieu a parameter can also be determined, and the q and a parameters can be utilized to determine the m/z ratio of the analyte ion (or its fragments). The calibration curve can then be utilized to adjust the value of the q parameter and the adjusted value of the q parameter can be employed to derive a more accurate m/z ratio of the analyte ion (or its fragments).

Figure 3:
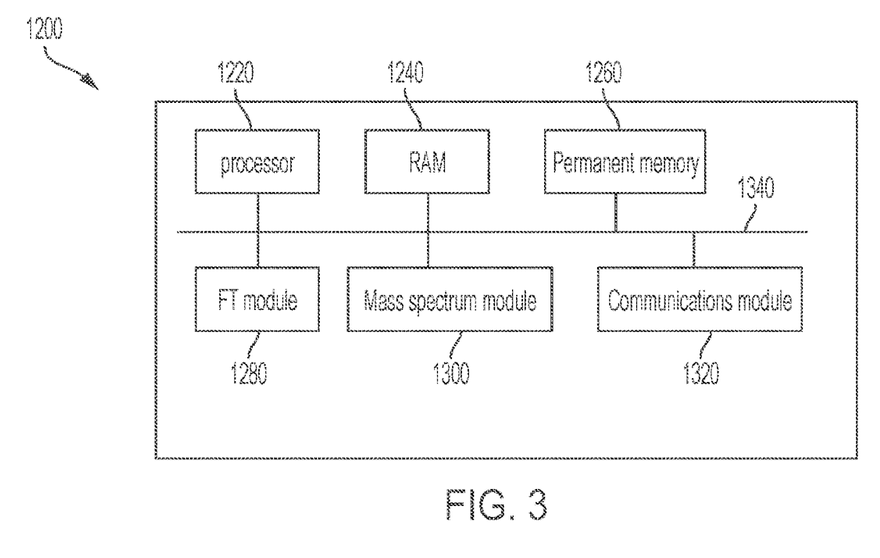
FIG. 3 is a schematic implementation of an analysis module in accordance with an embodiment, which can receive mass detection signals and operate on those signals to generate a calibration curve and/or use a previously-obtained calibration curve to obtain m/z ratio for an analyte of interest.

The analyzer 1022 can be implemented in hardware and/or software in a variety of different ways. By way of example, FIG. 3 schematically depicts an embodiment of the analyzer 1022, which includes a processor 1220 for controlling the operation of the analyzer. The exemplary analyzer 1022 further includes a random-access memory (RAM) 1240 and a permanent memory 1260 for storing instructions and data. The analyzer 1022 also includes a Fourier transform (FT) module 1280 for operating on the time-varying ion signal received from the detector 1020 (e.g., via Fourier transform) to generate a frequency domain signal, and a module 1300 for calculating the mass spectrum of the detected ions based on the frequency domain signal. A communications module 1320 allows the analyzer to communicate with the detector 1020, e.g., to receive the detected ion signal. A communications bus 1340 allows various components of the analyzer to communicate with one another.

In some embodiments, the FT mass analyzer can include an auxiliary electrode, which can extend from an input port of the mass analyzer to its output port and to which a pulsed excitation voltage can be applied. Similar to the previous embodiment, the voltage pulse can cause radial excitation of at least some of the ions passing through the quadrupole. As discussed above, the interaction of the radially excited ions with the fringing fields in proximity of the output end of the quadrupole can convert the radial oscillations to axial oscillations, and the axially oscillating ions can be detected by a detector (not shown in this figure). Similar to the previous embodiment, an analyzer, such as the analyzer 1022 discussed above, can operate on a time-varying ion signal generated as a result of the detection of the axially oscillating ions to generate a frequency domain signal and can operate on the frequency domain signal to generate a mass spectrum of the detected ions.

Figure 4:
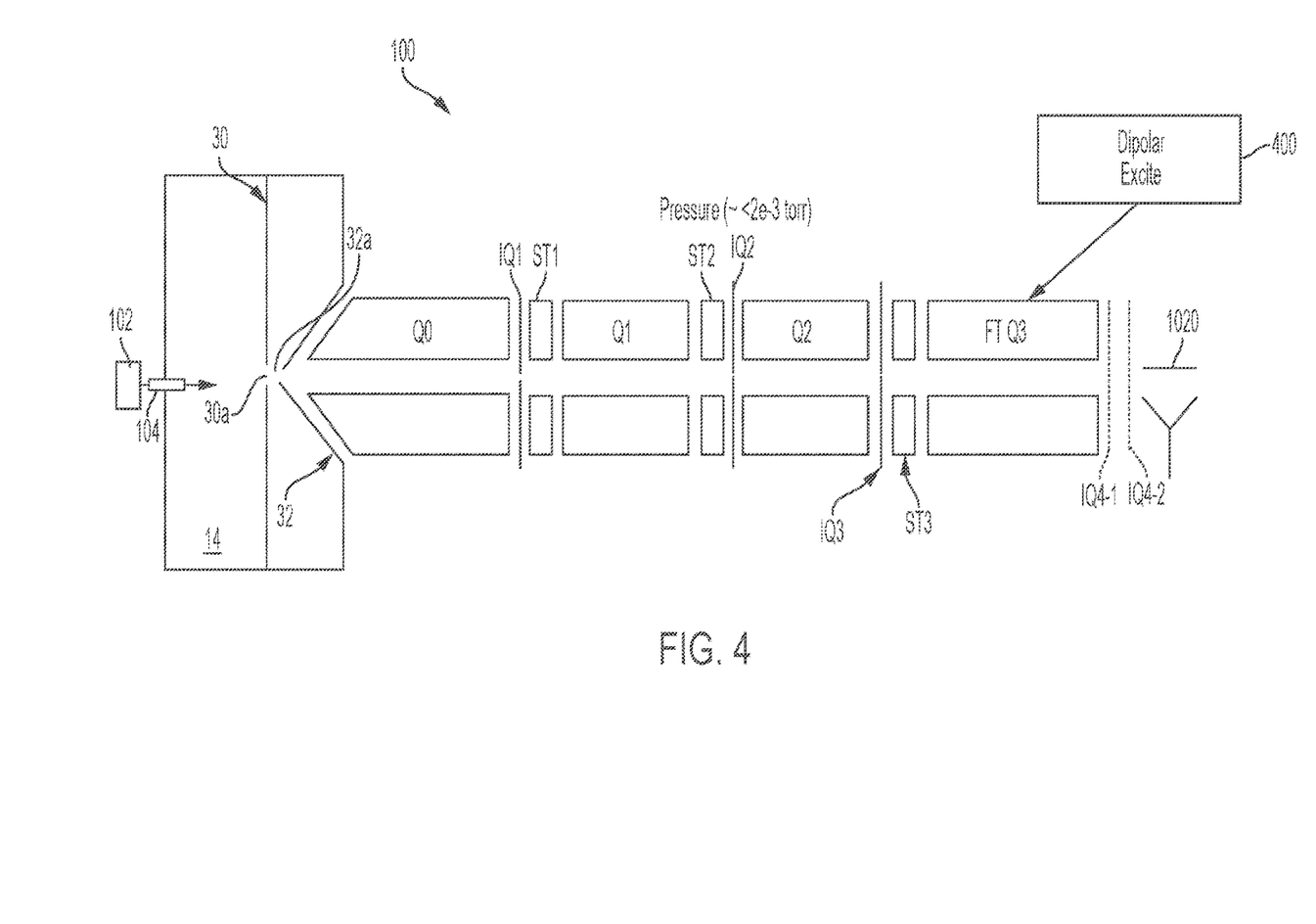
FIG. 4 is a schematic illustration of a mass spectrometer that includes an FT mass analyzer according to an embodiment of the present teachings.

A calibration method and system according to the present teachings can be employed in a variety of mass spectrometers. By way of example, FIG. 4 schematically depicts such a mass spectrometer 100, which comprises an ion source 104 that can receive a liquid sample from a sample source 102 and can generate ions within an ionization chamber 14. A variety of ion sources can be employed. Some examples of such ion sources include, without limitation, an electrospray ionization device, a nebulizer assisted electrospray device, a chemical ionization device, a nebulizer assisted atomization device, a matrix-assisted laser desorption/ionization (MALDI) ion source, a photoionization device, among others.

The mass spectrometer further includes a curtain plate 30 and an orifice plate 32 having apertures 30a/32a, respectively, through which the ions can traverse to reach an ion guide Q0. A curtain gas supply (not shown) can provide a curtain gas flow (e.g., $N_2$) between the curtain plate 30 and the orifice plate 32 to aid in keeping the downstream section of the mass spectrometer clean by declustering and evacuating large neutral particles. By way of example, a portion of the curtain gas can flow out of the curtain plate aperture into the ionization chamber 14, thereby inhibiting the entry of droplets through the curtain plate aperture.

The ion guide Q0 can be formed by a quadrupole arrangement of four rods providing a space therebetween for the passage of ions therethrough. The ion guide Q0 can focus the ions via a combination of gas dynamics and RF voltages applied to its rods. An ion lens IQ1 and a quadrupole stubby lens ST1 can focus the ions as they pass from the Q0 ion guide into Q1 ion guide. In this embodiment, the Q1 ion guide can function as a mass analyzer to allow the selection of ions with a selected m/z ratio (or a range of m/z ratios) for passage to Q2 ion guide, via a stubby lens ST2 and an ion lens IQ1. Similar to Q1, in this embodiment, the Q2 ion guide includes four rods that are arranged in a quadrupole configuration.

In some embodiments, the Q2 ion guide can be configured as a collision cell to cause fragmentation of at least a portion of the ions received from Q1. A stubby lens ST3 and an ion lens IQ3 separates Q2 ion guide from an FT mass analyzer Q3. A pulsed voltage source 400 allows application of an excitation voltage to the rods of the FT mass analyzer to excite at least a portion of ions received by Q3 at their secular frequencies. The interaction of the radially excited ions with the fringing fields in the vicinity of the distal end of the FT mass analyzer converts the radial oscillation of the ions into axial oscillations, which can be detected by the detector 1020 after the ions exit the FT mass analyzer and reach the detector via ion lenses IQ4-1 and IQ4-2.

The analysis module 1022 can then receive the detection signals and operate on the signals to generate a mass spectrum. As discussed above, the analysis module 1022 can employ a previously-generated q-dependent $\Delta V_{RF}$ calibration curve to improve the calculated m/z ratios of the analytes, in a manner discussed above.

The following Example is provided for further elucidation of various aspects of the present teachings. It is provided only for illustrative purposes and is not intended to indicate necessarily the optimal ways of practicing the present teachings and/or optimal results that may be obtained.

Example

A Fourier Transform (FT) quadrupole mass spectrometer, such as the spectrometer depicted in FIG. 4, was employed to obtain the data presented in this Example. The above calibration methods were employed to obtain q-dependent $\Delta V_{RF}$ calibration curves for the following ions: $OC_3H_6(H+)$ (m/z 59); amino-dPEG 4-acid (m/z 266); reserpine (m/z 609), and the peptide ALILTLVS (m/z 829).

Figure 5:
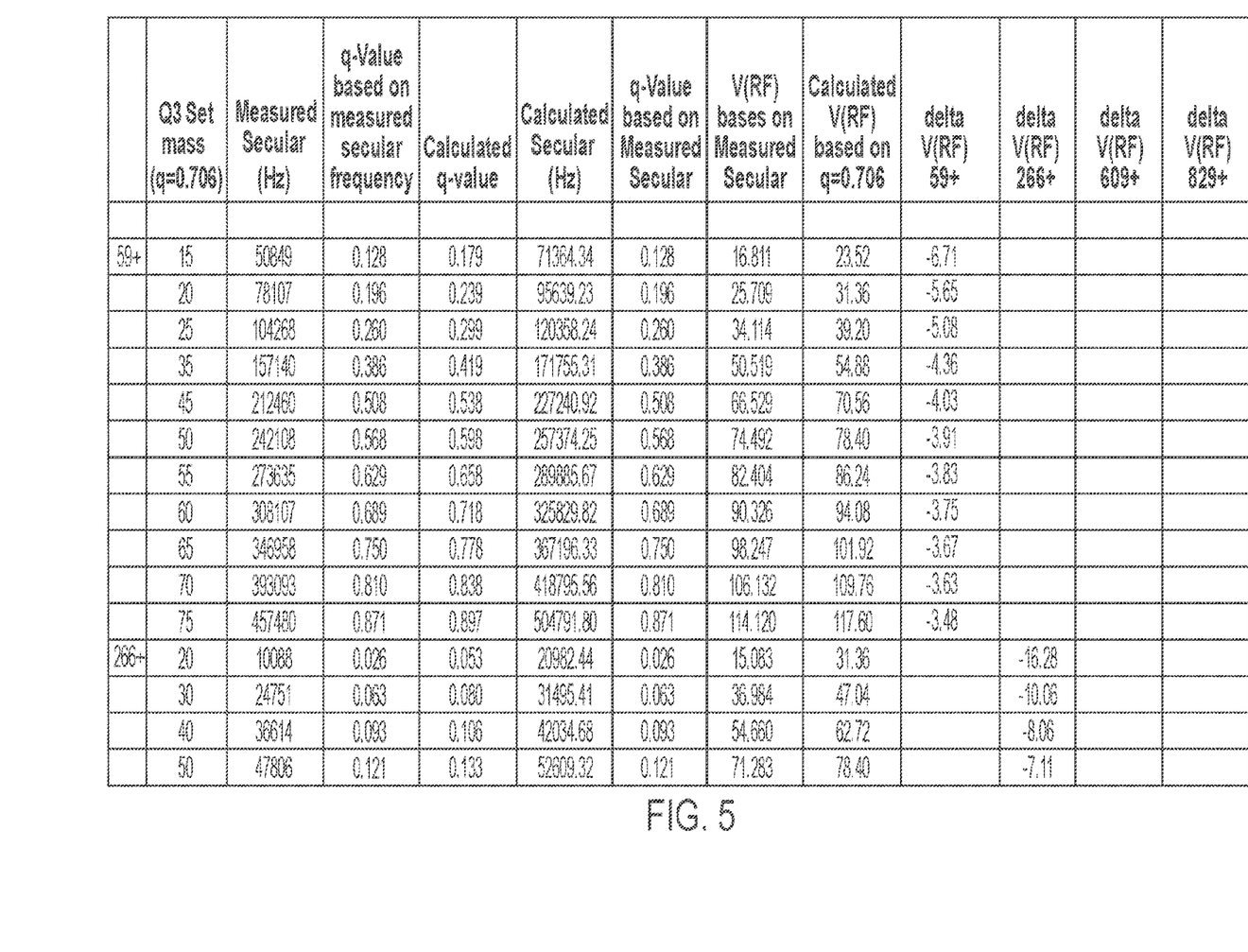
FIG. 5 is a table presenting comparative data indicative of measured versus calculated secular frequencies for several ions for a number of different masses, where the resulting voltage differences are used to obtain an adjusted q-value and m/z-value.

FIG. 5 provides a table presenting data corresponding to measured v.s. calculated (based on q=0.706) secular frequencies for the above ions. The resulting voltage differences can be used to obtain an adjusted q-value and hence a more accurate m/z value.

Figure 6:
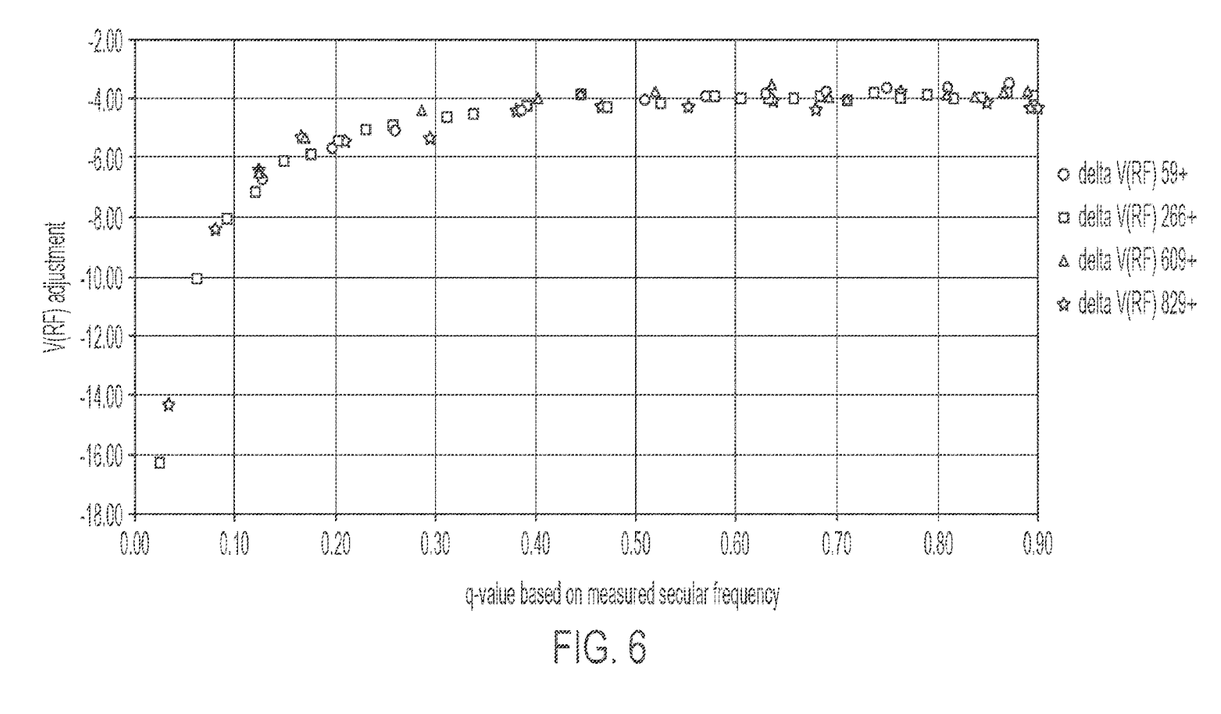
FIG. 6 is a plot of RF voltage adjustment versus q-value based on measured secular frequencies.

FIG. 6 is a plot of the RF voltage adjustment versus q-value based on the measured secular frequencies. The calculated values are based on a=0, $\Omega$=1.1174 MHz, and $r_0$ (the radius of FT mass analyzer quadrupole configuration)=4.17 mm. The initial q value was assumed to be 0.706.

The plotted data shows that the RF voltage correction depends on the q-value determined from the secular frequency. The calibration curve depicted in FIG. 6 allows obtaining a better estimate for the $\beta$ value, and thus the q value. This can in turn be used to calculate a better m/z value for an analyte under study.

The above data for the different ions shows that the relationship between $V_{RF}$ and q is independent of an ion's m/z value. Thus, the plot of any of the ions can be employed to calibrate the FT mass spectrometer. In other words, one calibrant ion can be sufficient for calibrating the mass spectrometer for measuring the m/z ratios of a plurality of different analytes.

Those having ordinary skill in the art will appreciate that various changes can be made to the above embodiments without departing from the scope of the present teachings.

What is claimed is:

1. A method of calibrating a Fourier Transform (FT) quadrupole mass spectrometer, comprising:
   measuring a plurality of secular frequencies of a calibrant ion in a multipole FT mass analyzer for a plurality of RF voltages ($V_{RF}$) applied to at least one rod of said multipole mass analyzer,
   calculating Mathieu $\beta$ and q parameters for each of said measured secular frequencies,
   determining RF voltage amplitude ($V_{RF}$) for each calculated q parameter,
   for each calculated q parameter, determining an offset RF voltage amplitude ($\Delta_{RF}$) corresponding to a deviation of said applied $V_{RF}$ and said calculated $V_{RF}$ to generate a $\Delta V_{RF}$ v.s. q calibration curve.

2. The method of claim 1, further comprising
   measuring a secular frequency of an analyte,
   calculating Mathieu $\beta$ and q parameters for said analyte based on said measured secular frequency,
   using said calibration curve to determine an adjusted q parameter for said analyte, and
   calculating an m/z ratio of said analyte based on said adjusted q parameter.

3. The method of claim 2, further comprising a resolving DC voltage applied to at least one rod of said multipole FT mass analyzer.

4. The method of claim 3, wherein said Mathieu q parameter is determined based on said calculated $\beta$ and a parameters.

5. The method of claim 1, further comprising measuring a resolving DC voltage applied to at least one of the multipole rods.

6. The method of claim 5, further comprising calculating Mathieu a parameter based on said measured resolving DC voltage.

7. The method of claim 6, wherein said q parameter is determined based on said calculated $\beta$ and a parameters.

8. The method of claim 1, wherein said plurality of RF voltages have a peak-to-peak amplitude in a range of about 50 to about 5000 volts.

9. The method of claim 1, wherein said plurality of RF voltages have a frequency in a range of about 0.5 to about 3 MHz.

10. The method of claim 1, wherein said resolving DC voltage is in a range of about 5 to about 250 volts.

11. The method of claim 1, wherein said step of measuring the secular frequencies comprises introducing the calibrant ion into the FT mass analyzer.

12. The method of claim 11, further comprising applying a pulsed excitation voltage to at least one rod of said multipole mass analyzer so as to excite said calibrant ion at a secular frequency thereof.

13. The method of claim 12, wherein said pulsed excitation voltage comprises a dipolar excitation.

14. The method of claim 12, wherein said multipole mass analyzer has any of a quadrupole, a hexapole and an octupole configuration.

15. A mass spectrometer, comprising:
   a Fourier Transform (FT) mass analyzer having a plurality of rods arranged in a multipole configuration and having an input port for receiving a plurality of ions and an output port through which the ions exit the mass analyzer, a system for measuring a plurality of secular frequencies of a calibrant ion introduced into said multipole mass analyzer for a plurality of RF voltages ($V_{RF}$) applied to at least one rod of said FT mass analyzer, and an analysis module receiving said measured secular frequencies and performing the following operations:
calculating Mathieu β and q parameters for each of said measured secular frequencies,
determining RF voltage amplitude ($V_{RF}$) for each calculated q parameter,
for each calculated q parameter, determining an offset RF voltage amplitude ($\Delta_{RF}$) corresponding to a deviation of said applied $V_{RF}$ and said calculated $V_{RF}$ to generate a $\Delta V_{RF}$ v.s. q calibration curve.

16. The mass spectrometer of claim 15, wherein said system is further configured to measure a resolving DC voltage applied to at least one of the rods of FT mass analyzer.

17. The mass spectrometer of claim 16, wherein said analysis module is configured to receive said measured resolving DC voltage and calculate Mathieu a parameter based on said measured resolving DC voltage.

18. The mass spectrometer of claim 17, wherein said analysis module determines the q parameter based on said calculated β and a parameters.

* * * * *